United States Patent
Matsumoto

(10) Patent No.: US 7,650,295 B2
(45) Date of Patent: Jan. 19, 2010

(54) METHOD, APPARATUS, AND MEDIUM FOR REMOTE APPROVAL OF A DELIVERY IF THE RECIPIENT IS ABSENT FROM THE DELIVERY LOCATION

(75) Inventor: Mutsumi Matsumoto, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 341 days.

(21) Appl. No.: 10/046,257

(22) Filed: Jan. 16, 2002

(65) Prior Publication Data

US 2002/0092903 A1    Jul. 18, 2002

(30) Foreign Application Priority Data

Jan. 17, 2001    (JP)    ............... 2001-008844

(51) Int. Cl.
*G06F 17/30*    (2006.01)

(52) U.S. Cl. .......................... 705/26; 705/27

(58) Field of Classification Search ............. 705/26–27, 705/1

See application file for complete search history.

(56) References Cited

U.S. PATENT DOCUMENTS

| | | | | |
|---|---|---|---|---|
| 6,690,997 B2* | 2/2004 | Rivalto | ...................... | 700/237 |
| 7,174,307 B2* | 2/2007 | Sakai et al. | ................... | 705/26 |
| 7,222,081 B1* | 5/2007 | Sone | .............................. | 705/7 |
| 2002/0035515 A1* | 3/2002 | Moreno | ....................... | 705/26 |

FOREIGN PATENT DOCUMENTS

| | | |
|---|---|---|
| JP | 62-054360 | 3/1987 |
| JP | 9-231428 | 9/1997 |
| JP | 2000-048074 | 2/2000 |
| WO | WO 01/08078 A1 * | 2/2001 |

OTHER PUBLICATIONS

"ShopperBox Networks Launches E-Commerce Delivery Solution," PR Newswire, New York, Aug. 1, 2000, p. 1.*
Matthews, Ryan Consumer-direct: Will stores survive? ProgressiveGrocer, v76v5, p. 30-38, May 1997.*
JP Search Report.

* cited by examiner

*Primary Examiner*—Jeffrey A Smith
*Assistant Examiner*—Matthew Zimmerman
(74) *Attorney, Agent, or Firm*—Staas & Halsey LLP

(57) ABSTRACT

The method of managing delivery goods comprises the steps of receiving identification information for delivery goods entered by a deliverer when a recipient of the delivery goods is not at home, extracting delivery goods information and recipient information relevant to the delivery-goods identification information from a storage unit which stores the delivery goods information and the recipient information corresponding to the delivery goods information, and notifying the recipient of the delivery goods information based on the recipient information.

8 Claims, 17 Drawing Sheets

| USER ID | NAME | ADDRESS | TELEPHONE NUMBER | MAIL ADDRESS | PASSWORD |
|---|---|---|---|---|---|
| s1 | SATO | KAWASAKI-SHI, NAKAHARA-KU, KAMIKONAKA 1-1-1 | 090-1111-1111 | sato@s1.co.jp | s1s1s1 |
| s2 | SUZUKI | YOKOHAMA-SHI, KOHOKU-KU, SHIN-YOKOHAMA 2-2-2 | 090-2222-2222 | suzuki@s2.co.jp | s2s2s2 |

| DELIVERER ID | NAME | TELEPHONE NUMBER | MAIL ADDRESS | PASSWORD |
|---|---|---|---|---|
| t1 | TANAKA | 090-3333-3333 | tanaka@s1.co.jp | t1t1t1 |

| DELIVERY GOODS IDENTIFICATION INFORMATION | ITEM NAME | CLIENT ID | RECIPIENT ID | DELIVERER ID | DELIVERY STATUS |
|---|---|---|---|---|---|
| 111-1111-1111 | BOOK | s1 | s2 | t1 | UNDER DELIVERY |

802

| DELIVERY GOODS IDENTIFICATION INFORMATION | ITEM NAME | CLIENT ID | RECIPIENT ID | DELIVERER ID | DELIVERY STATUS |
|---|---|---|---|---|---|
| 111-1111-1111 | BOOK | s1 | s2 | t1 | RECEPTION IS UNDER CONFIRMATION |

803

| DELIVERY GOODS IDENTIFICATION INFORMATION | ITEM NAME | CLIENT ID | RECIPIENT ID | DELIVERER ID | DELIVERY STATUS |
|---|---|---|---|---|---|
| 111-1111-1111 | BOOK | s1 | s2 | t1 | RECEPTION APPROVED |

804

| DELIVERY GOODS IDENTIFICATION INFORMATION | ITEM NAME | CLIENT ID | RECIPIENT ID | DELIVERER ID | DELIVERY STATUS |
|---|---|---|---|---|---|
| 111-1111-1111 | BOOK | s1 | s2 | t1 | RECEPTION REFUSED |

805

| DELIVERY GOODS IDENTIFICATION INFORMATION | ITEM NAME | CLIENT ID | RECIPIENT ID | DELIVERER ID | DELIVERY STATUS |
|---|---|---|---|---|---|
| 111-1111-1111 | BOOK | s1 | s2 | t1 | DELIVERY COMPLETED |

FROM : DELIVERY MANAGEMENT CENTER
SUB : NOTIFICATION ON RECEPTION REFUSAL OF THE DELIVERY GOODS

TO MR. SATO
WE ARE SORRY TO INFORM YOU THAT THE DELIVERY GOODS REQUESTED BY YOU HAVE BEEN REFUSED BY THE RECIPIENT.

1102

THE INFORMATION FOR THE DELIVERY GOODS MAY BE WRONG.
PLEASE CONFIRM THE INFORMATION.

DELIVERY GOODS INFORMATION
DELIVERY GOODS IDENTIFICATION INFORMATION :
111-1111-1111
ITEM NAME : BOOK
RECIPIENT : SUZUKI
ADDRESS : YOKOHAMA-SHI, KOHOKU-KU,
SHIN-YOKOHAMA 2-2-2

1103

FROM : DELIVERY MANAGEMENT CENTER
SUB : NOTIFICATION ON COMPLETION OF THE DELIVERY OF THE DELIVERY GOODS TO MR. SATO
WE ARE PLEASED TO INFORM YOU THAT THE DELIVERY OF THE DELIVERY GOODS REQUESTED BY YOU HAS BEEN COMPLETED.

DELIVERY GOODS INFORMATION
DELIVERY GOODS IDENTIFICATION INFORMATION :
111-1111-1111
ITEM NAME : BOOK
RECIPIENT : SUZUKI
ADDRESS : YOKOHAMA-SHI, KOHOKU-KU,
SHIN-YOKOHAMA 2-2-2

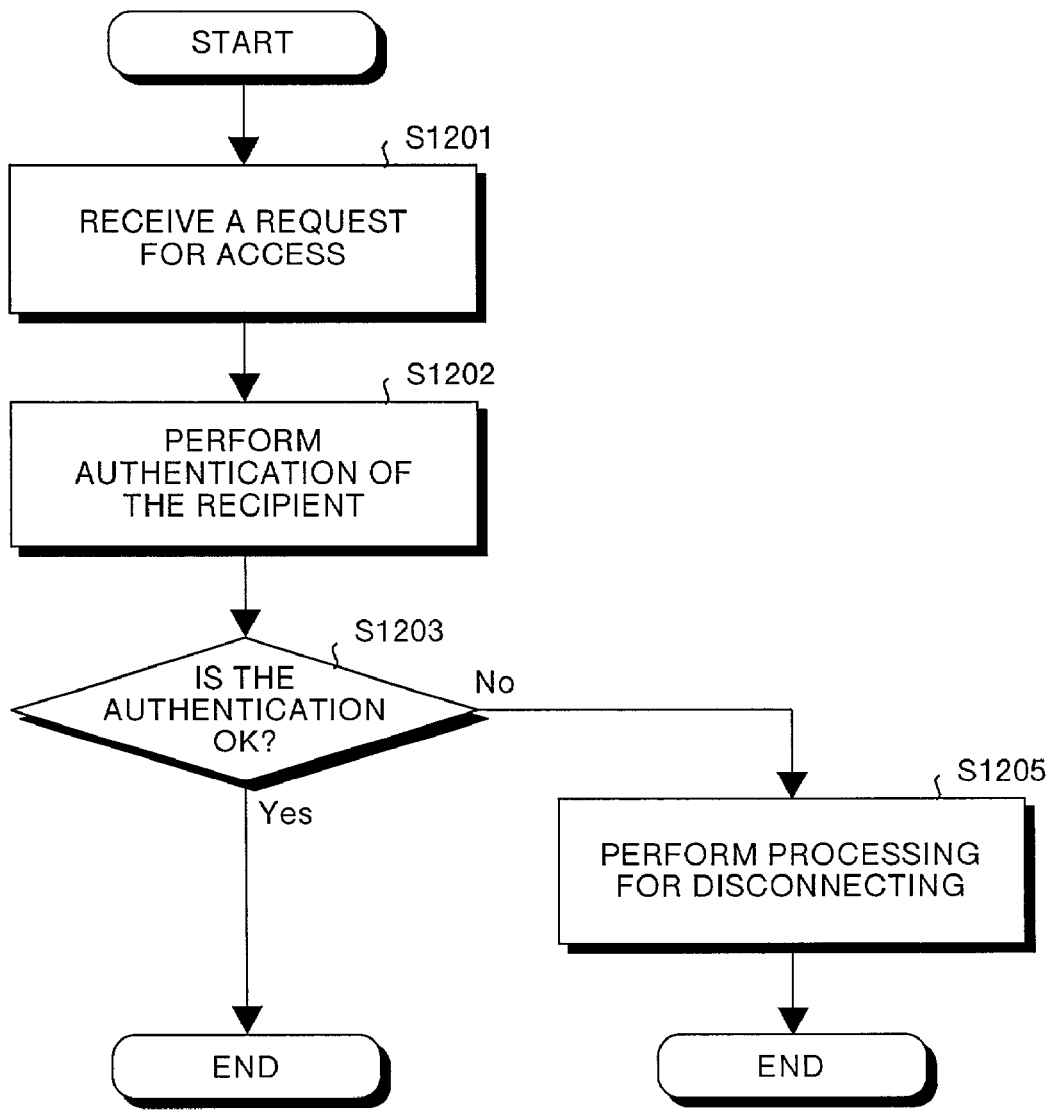

FROM : TANAKA, DELIVERER OF ABC TRANSPORT FIRM
SUB : REQUEST TO CONFIRM RECEPTION OF DELIVERY GOODS

WE ARE ASKED TO DELIVER THE DELIVERY GOODS TO YOU.
PLEASE CONFIRM THE RECEPTION.

DELIVERY GOODS INFORMATION
IDENTIFICATION INFORMATION :
111-1111-1111
ITEM NAME : BOOK
CLIENT : SATO
RECIPIENT : SUZUKI

WE WOULD LIKE TO ASK YOU TO NOTIFY US OF THE RESULT OF CONFIRMATION BY TELEPHONE OR E-MAIL.
TELEPHONE NUMBER :
090-3333-3333
MAIL ADDRESS : tanaka@t1.co.jp

\*REPLY BY E-MAIL
REPLY BY TELEPHONE

1802

I AM PLEASED TO RECEIVE THE DELIVERY GOODS SPECIFIED BELOW.
PUT IT IN THE BOX BELOW, PLEASE.

BOX NUMBER : 606
SECRET NUMBER : 1234

<DELIVERY GOODS INFORMATION
<IDENTIFICATION INFORMATION :
111-1111-1111
<ITEM NAME : BOOK
<CLIENT : SATO
<RECIPIENT : SUZUKI

1803

I AM SORRY THAT I DO NOT RECEIVE THE DELIVERY GOODS SPECIFIED BELOW.
I THINK SOMETHING MUST BE WRONG, SO TAKE IT BACK, PLEASE.

<DELIVERY GOODS INFORMATION
<IDENTIFICATION INFORMATIO :
111-1111-1111
<ITEM NAME : BOOK
<CLIENT : SATO
<RECIPIENT : SUZUKI

METHOD, APPARATUS, AND MEDIUM FOR REMOTE APPROVAL OF A DELIVERY IF THE RECIPIENT IS ABSENT FROM THE DELIVERY LOCATION

FIELD OF THE INVENTION

The present invention relates to a method of and apparatus for managing delivery goods and computer products.

BACKGROUND OF THE INVENTION

There is a case that a recipient of delivery goods requiring "delivery goods reception approval" is absent so that a delivery person has to visit again the recipient to receive the reception approval and deliver the delivery goods. On the other hand, when failing to receive the delivery goods because he/she is away from home and the reception approval cannot be given to the deliverer, the recipient has to wait the next delivery, or go to a delivery center, where the recipient gives the reception approval to pick up the delivery goods.

As a first problem to be solved, the deliverer cannot complete delivery because the recipient is not at home and the deliverer cannot obtain recipient's reception approval with respect to the delivery goods. As a second problem to be solved, the recipient fails to receive the delivery goods because the delivery goods is delivered while the recipient is away from home so that he/she cannot give the deliverer the reception approval with respect to the delivery goods.

SUMMARY OF THE INVENTION

It is an object of the present invention to solve the above first and second problems.

The first problem, that the deliverer cannot complete delivery because the recipient is not at home and the deliverer cannot obtain the reception approval that is needed for the delivery goods, can be solved by providing the method comprising the following steps. That is, the steps of receiving identification information for delivery goods entered by a deliverer when a recipient is absent, extracting delivery goods information and recipient information relevant to the delivery goods identification information from a storage unit which stores the delivery goods information and the recipient information corresponding to the delivery goods information, and notifying the recipient of the delivery goods information based on the recipient information.

The second problem, that the recipient fails to receive the delivery goods because the delivery goods is delivered while the recipient is away from home and cannot give the deliverer reception approval with respect to the delivery goods, can be solved by providing a unit for solving the first problem by means of the method further having the following steps. That is, the steps of further storing deliverer information corresponding to the delivery goods information in the storage unit and receiving the delivery goods identification information and reception approval/refusal information entered by the recipient, extracting the deliverer information relevant to the delivery goods identification information from the storage unit, and notifying the deliverer of the reception approval/refusal information based on the deliverer information.

Other objects and features of this invention will become apparent from the following description with reference to the accompanying drawings.

BRIEF DESCRIPTION OF THE DRAWINGS

FIG. 6 shows an example of a user DB of the first embodiment;

FIG. 7 shows an example of a deliverer DB of the first embodiment;

FIG. 8 shows an example of a delivery goods information DB of the first embodiment;

FIG. 11 shows an example of display screens in a client terminal of the first embodiment;

FIG. 12 shows a program for receiving result notification of the first embodiment;

FIG. 18 shows an example of display screens in the recipient terminal of the second embodiment.

DETAILED DESCRIPTIONS

A first embodiment of the method for managing delivery goods according to this invention will be explained in detail below with reference to the drawings.

Figure 1:
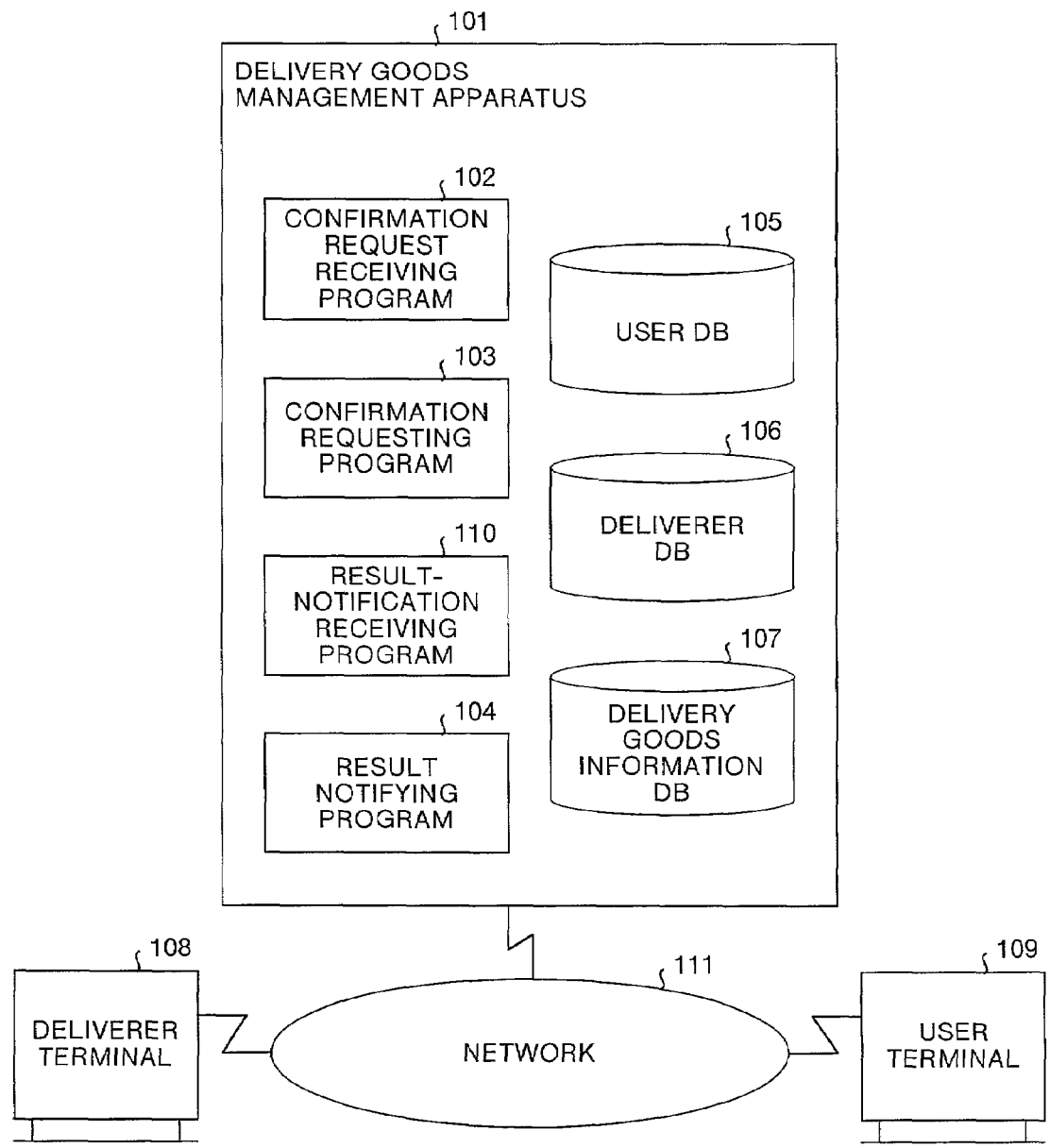
FIG. 1 is a block diagram showing a system construction of a first embodiment of this invention.

FIG. 1 shows the system construction of the first embodiment of this invention. In this figure, it is assumed that the delivery goods management apparatus 101 is connected with at least one deliverer terminal 108 operated by a deliverer and at least one user terminal 109 operated by a client or recipient, through a network 111.

The delivery goods management apparatus 101 is installed in, for example, a delivery goods management center of a package delivery company which is accessible by a deliverer and a recipient through their mobile phones. The delivery goods management apparatus 101 has the user DB 105 that stores user IDs and names, addresses, telephone numbers, mail addresses, and passwords, and the deliverer DB 106 that stores deliverer IDs and names, telephone numbers, mail addresses, and passwords. The delivery goods management apparatus 101 also has the delivery goods information DB 107 that stores identification information for delivery goods and item names, client IDs, recipient IDs, deliverer IDs, and respective delivery statuses. The delivery goods management apparatus 101 further has the program 102 for receiving a request to confirm reception of delivery goods from a deliverer and performing authentication of the deliverer, and the confirmation requesting program 103 for receiving the confirmation request after the authentication of the deliverer is verified, edit information for the confirmation request by referring to the user DB 105 and the delivery goods information DB 107, and for transmitting the edited confirmation request information to a recipient. Further, the delivery goods management apparatus 101 has the program 110 for receiving notification of the result from the recipient and performing authentication of the recipient, and the confirmation notifying program 104 for receiving a request for notification of the result after the authentication of the recipient is verified, editing information for the result notification by referring to the deliverer DB 106 and the delivery goods information DB 107, and transmitting the edited result notification information to the deliverer.

Figure 2:
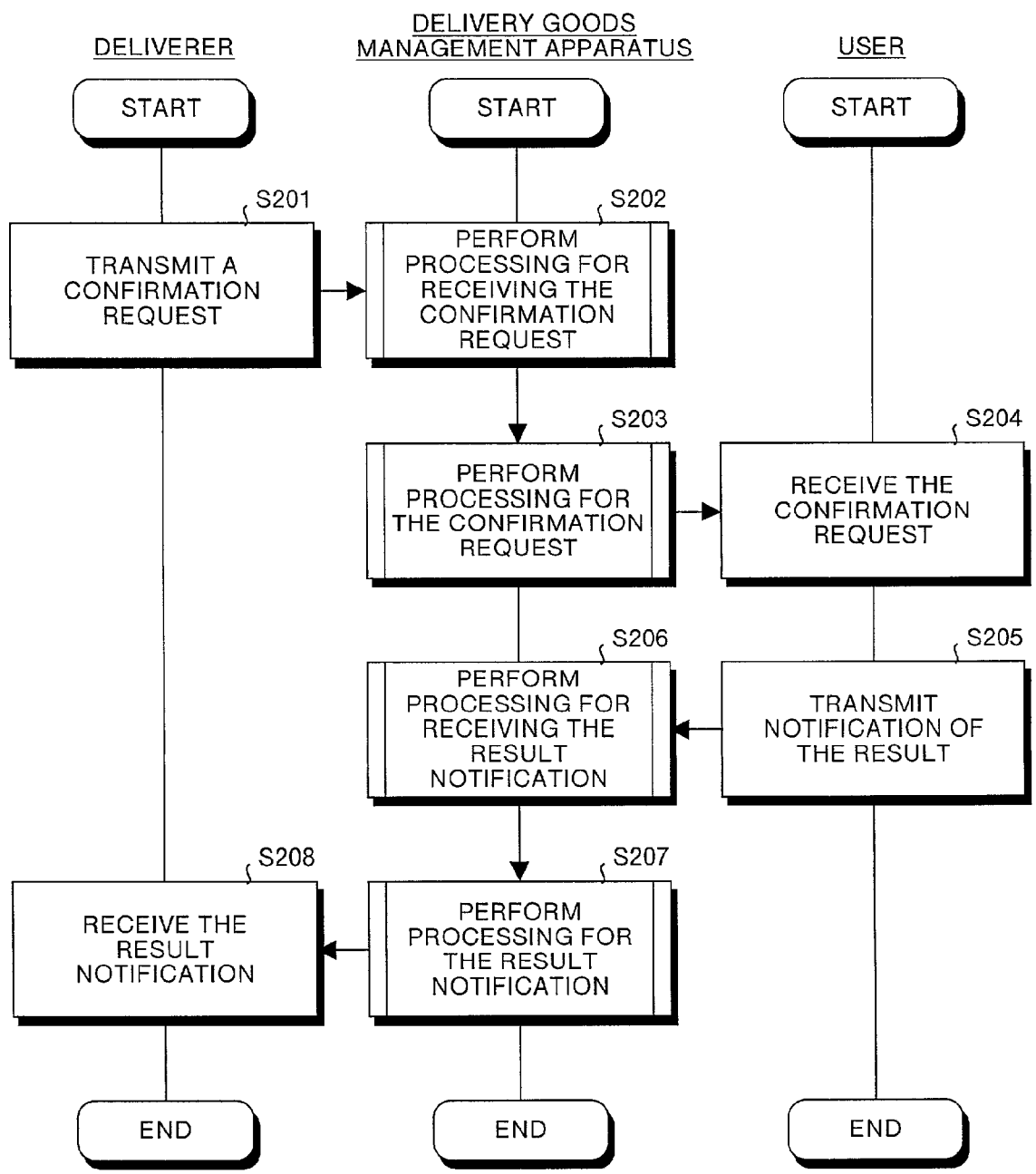
FIG. 2 is a flowchart for explaining the overall processing of the first embodiment.

The processing required for each request from a deliverer and a recipient, when the recipient of delivery goods requiring reception approval is not at home, will be explained below with reference to FIG. 1, FIG. 2, FIG. 6, FIG. 7, and FIG. 8. FIG. 2 is a flowchart for explaining the overall processing, FIG. 6 shows specific contents of the user DB 105, FIG. 7 shows specific contents of the deliverer DB 106, and FIG. 8 shows specific contents of the delivery goods information DB 107.

The respective information in FIG. 6, FIG. 7, and FIG. 8 that needs to be previously registered in order to realize this invention will be explained first. FIG. 6, FIG. 7, and FIG. 8 show respective information that is registered by an administrator of this system.

The legend 601 of FIG. 6 represents the user DB 105 of FIG. 1, in which user IDs, names, addresses, telephone numbers, mail addresses, and passwords are registered for each user.

The legend 701 of FIG. 7 represents the deliverer DB 106 of FIG. 1, in which the deliverer ID, name, telephone number, mail address, and the password are registered.

The legend 801 of FIG. 8 represents the delivery goods information DB 107 of FIG. 1 before authentication of the deliverer and user is performed, in which the identification information for the delivery goods, item name, client ID, recipient ID, deliverer ID, and the delivery status are registered.

The operation of the system will be explained below with reference to FIG. 2. More specifically, this system is for notifying a recipient of a delivery goods reception confirmation request from a deliverer when the recipient is not at home and the deliverer cannot obtain reception approval by the receiver that is needed for the delivery goods.

When a recipient of the delivery goods requiring reception approval is not at home, the deliverer transmits a request S201 to confirm reception of the delivery goods (transmission of the confirmation request) in order to confirm intention of the recipient, to the system. The information for the transmitted confirmation request includes the deliverer ID, password, and delivery status entered by the deliverer, and the delivery goods identification information selected by the deliverer.

The processing for the confirmation request is performed at S203 based on the processing for receiving the confirmation request received at S202.

Figure 3:
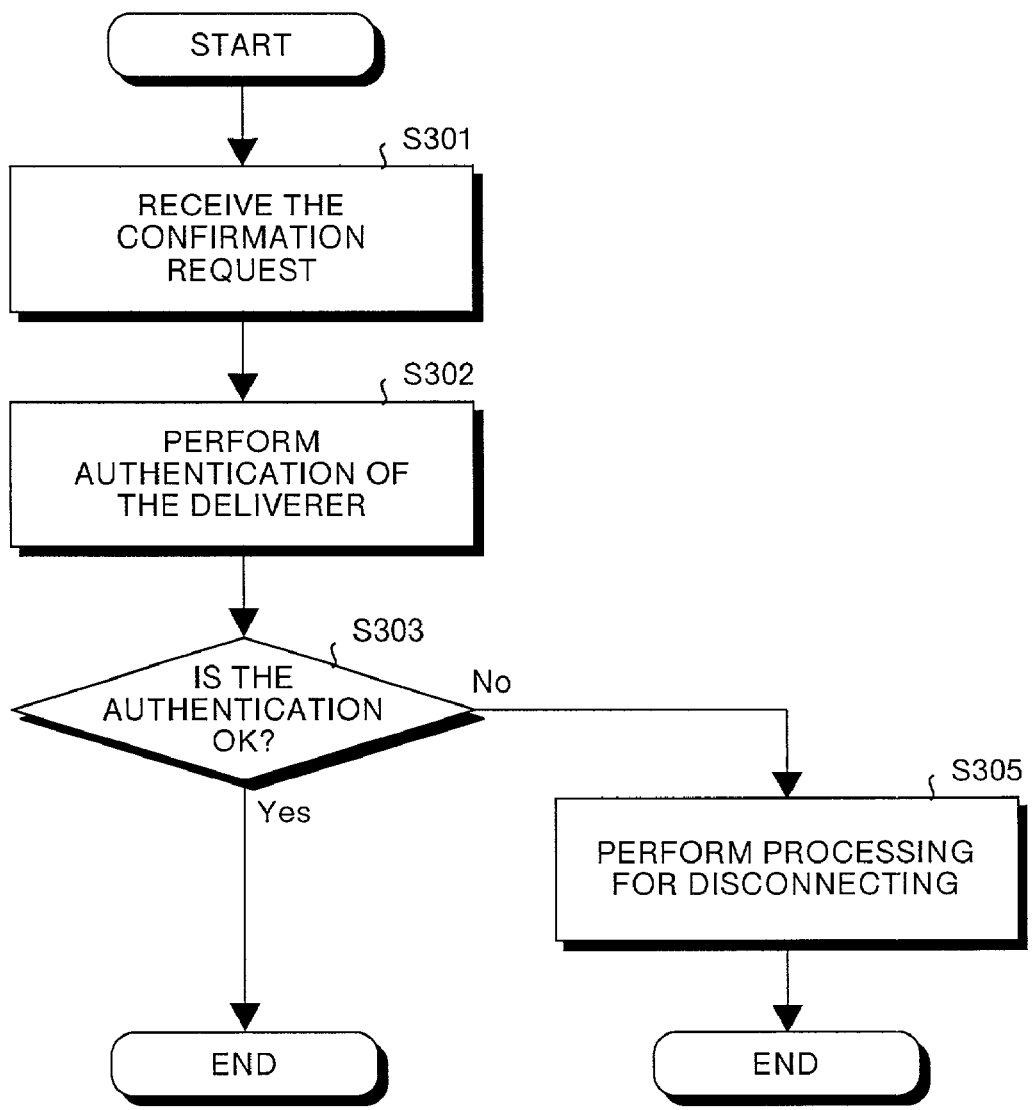
FIG. 3 shows a program for receiving a request to confirm reception of delivery goods of the first embodiment.

The processing for receiving the confirmation request will be explained below with reference FIG. 3. At S301, the system receives the confirmation request, and performs authentication of the deliverer at S302 by comparing the deliverer ID and password in the confirmation request information with the deliverer ID and password in the deliverer DB 106. At S303, the system determines whether the authentication of the deliverer is OK. When the deliverer authentication is OK, the system successfully ends the processing for reception of the confirmation request. But, when the deliverer authentication is NG, the system performs the processing for disconnecting S305.

Figure 9:
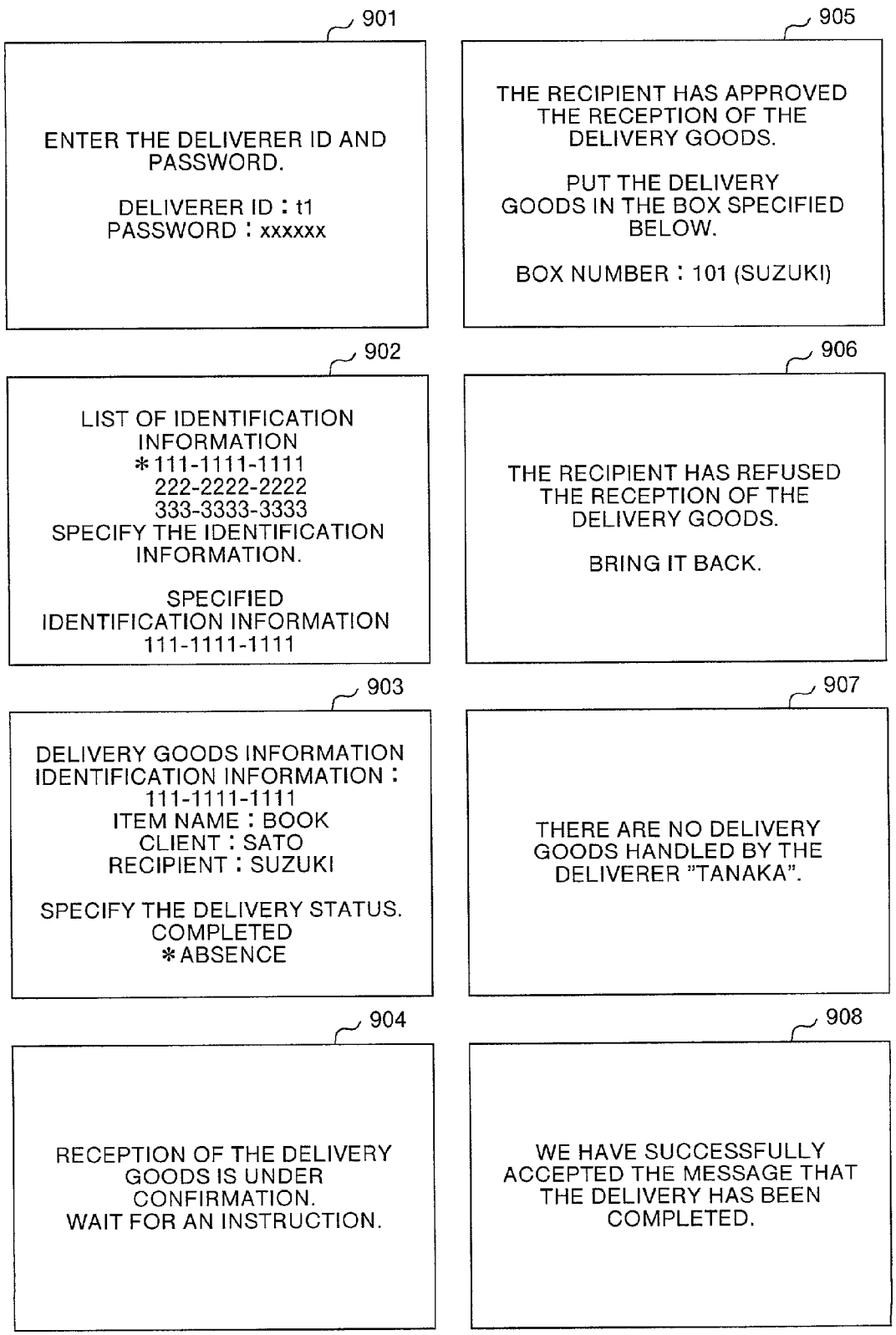
FIG. 9 shows an example of display screens in a deliverer terminal of the first embodiment.

Legend 901 of FIG. 9 represents the screen image of the deliverer terminal 108 when the deliverer "Tanaka" enters the user ID "tl" and password "tltltl" and transmits the confirmation request to the system.

Figure 4:
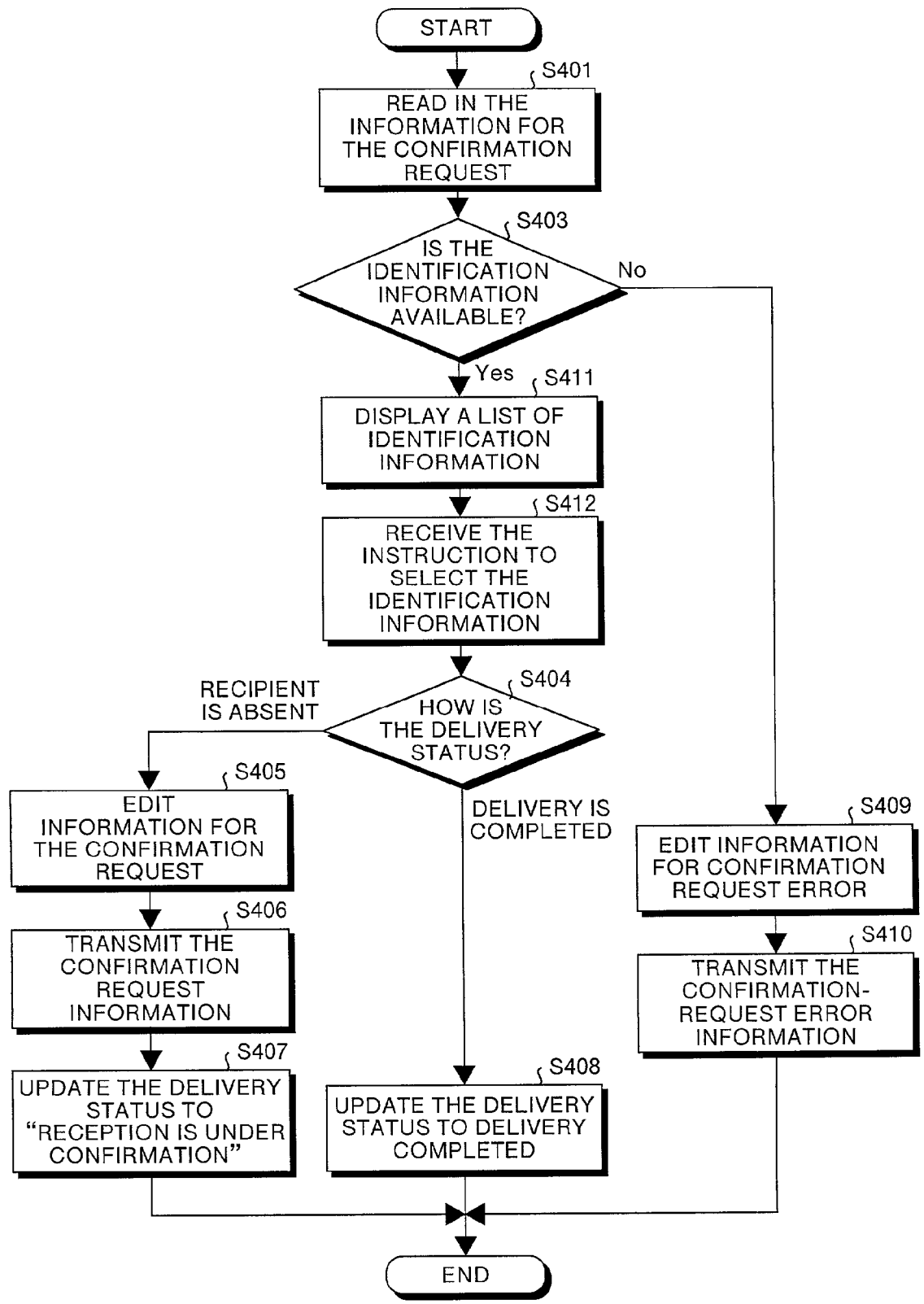
FIG. 4 is a flowchart for explaining the processing for the confirmation request of the first embodiment.

The processing for the confirmation request will be explained below with reference to FIG. 4. At S401, the system reads the information for the confirmation request sent from the deliverer, and retrieves the delivery goods identification information in the delivery goods information DB 107 corresponding to the deliverer ID in the confirmation request information at S403. If there is no such delivery goods identification information, the system edits information for confirmation request error at S409, and transmits the edited confirmation-request error information to the deliverer terminal 108 of FIG. 1 at S410.

The legend 907 of FIG. 9 represents an example of the message that the deliverer terminal 108 receives from the system when there is no delivery goods identification information available as a target for the delivery goods reception confirmation request after authentication of the deliverer "Tanaka" as a deliverer is completed.

When the delivery goods identification information is available, the system displays a list of the delivery goods identification information in the deliverer terminal 108 at S411. At S412, the system receives the delivery goods identification information specified by the deliverer.

The legend 902 of FIG. 9 represents the screen image of the deliverer terminal 108 when the deliverer "Tanaka", after being authenticated as a deliverer, specifies the identification information "111-1111-1111" as a target for the confirmation request.

At S404, the system determines the delivery status included in the transmitted confirmation request S201. When the delivery status is determined as "Delivery completed", the system updates the delivery status in the delivery goods information DB 107 of FIG. 1 corresponding to the delivery goods identification information specified by the deliverer, to "Delivery completed" at S408.

The legend 805 of FIG. 8 represents the delivery goods information DB 107 of FIG. 1 when the deliverer "Tanaka" selects "Delivery completed" as the delivery status of the delivery goods identification information "111-1111-1111".

The legend 908 of FIG. 9 represents the screen image of the deliverer terminal 108 when the deliverer "Tanaka", after being authenticated as a deliverer, specifies the delivery goods identification information "111-1111-1111" as a target for the confirmation request and "Completed" as the delivery status.

When the delivery status is "Absence", at S405, the system edits information for the confirmation request based on the delivery goods information DB 107 corresponding to the delivery goods identification information specified by the deliverer, and transmits, at S406, the confirmation request information whose destination is decided based on the user DB 105 corresponding to the delivery goods identification information specified by the deliverer, to the recipient terminal 109 of FIG. 1. Further, at S407, the system updates the delivery status in the delivery goods information DB 107 of FIG. 1 to "Reception is under confirmation".

The legend 802 of FIG. 8 represents the delivery goods information DB 107 of FIG. 1 when the deliverer "Tanaka" selects "Absence" as the delivery status of the delivery goods identification information "111-1111-1111".

The legend 903 of FIG. 9 represents the screen which displays information for the item name "Book", client "Sato", and recipient "Suzuki" relating to the delivery goods identification information "111-1111-1111" as a target for the confirmation request after authentication of the deliverer "Tanaka" as a deliverer is complete, and in which the deliverer "Tanaka" selects "Delivery completed" or "Absence" with respect to the delivery goods identification information "111-1111-1111".

The legend 904 of FIG. 9 represents an example of the message that the deliverer terminal 108 receives from the system when the delivery status is "Absence".

The recipient who has received the confirmation request from the system transmits notification of the result to the system.

Figure 10:
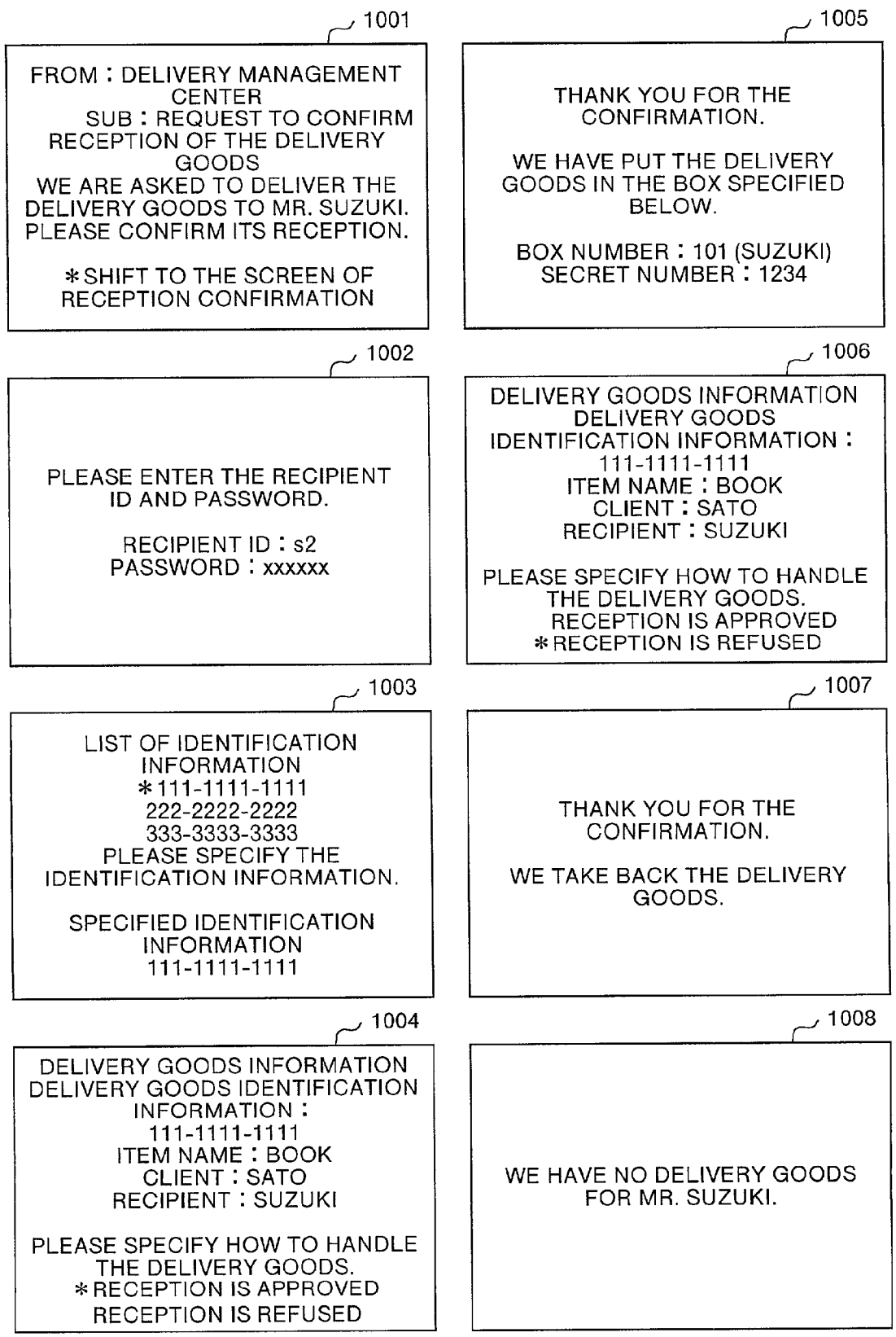
FIG. 10 shows an example of display screens in a recipient terminal of the first embodiment.

The legend 1001 of FIG. 10 represents an example of the message in the user terminal 109 of the recipient "Suzuki" who has received the delivery goods reception confirmation request S204 from the system.

The operation of the system will be explained below with reference to FIG. 2. More specifically, this operation is performed in order that the recipient having received the confirmation request from the deliverer notifies him of recipient's intention when the recipient is absent so that reception approval needed for the delivery goods is not given to the deliverer.

The recipient performs transmission S205 of result notification in order to notify the deliverer of the recipient's intention. The information for the transmitted result notification includes the recipient ID, password, and delivery status entered by the recipient, and also includes the delivery goods identification information selected by the recipient. The system performs the processing for result notification at S207 based on the result notification received at S206. The deliverer finishes the delivery according to the result notification S208 received from the system.

The processing for receiving the result notification will be explained below with reference to FIG. 12.

At S1201, the system receives the result notification, and performs authentication of the recipient, at S1202, by comparing the recipient ID and password in the information for the result notification with the user ID and password in the user DB 105. At S1203, the system determines whether the recipient authentication is OK. When the recipient authentication is OK, the system successfully ends the processing for receiving the result notification. When the recipient authentication is NG, the system performs the processing for disconnecting S1205. The legend 1002 of FIG. 10 represents the screen image of the user terminal 109 when the recipient "Suzuki" enters the user ID "s2" and password "s2s2s2" and transmits the result notification to the system.

Figure 5:
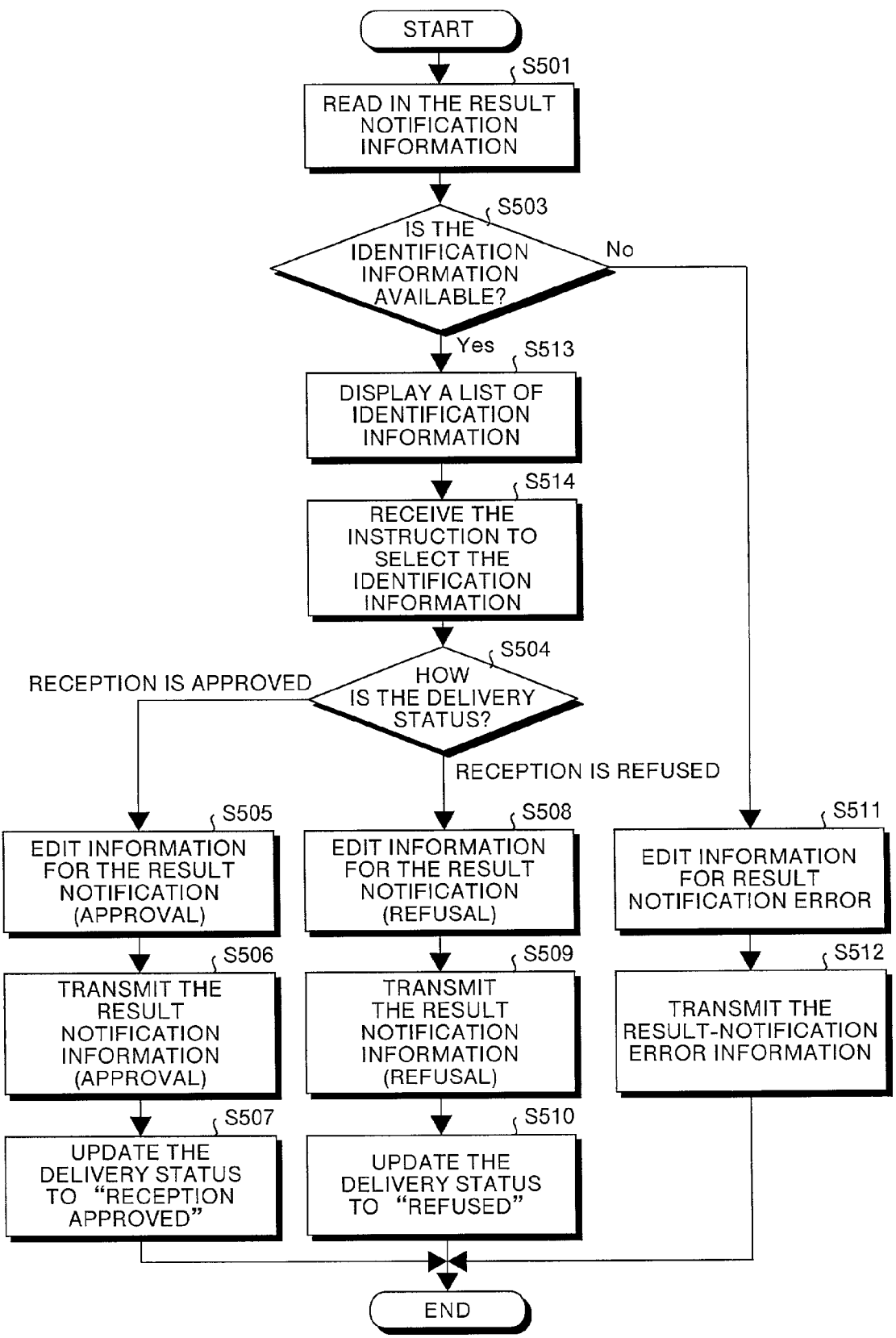
FIG. 5 is a flowchart for explaining the processing for result notification of the first embodiment.

The processing for notifying the result will be explained below with reference to FIG. 5. At S501, the system reads out the information for the result notification, and retrieves the delivery goods identification information in the delivery goods information DB 107 corresponding to the recipient ID in the result notification at 503.

The legend 1003 of FIG. 10 represents the screen image of the user terminal 109 when the recipient "Suzuki" specifies the delivery goods identification information "111-1111-1111" as a target for the result notification.

If there is no such delivery goods identification information, at S511, the system edits information for result notification error, and transmits the edited result-notification error information to the user terminal 109 at S512.

The legend 1008 of FIG. 10 represents the screen image of the user terminal 109 displayed after authentication of the recipient "Suzuki" as a recipient is complete when there is no delivery goods identification information available as a target for delivery goods reception approval.

When the delivery goods identification information is available, at S513, the system displays a list of the delivery goods identification information in the deliverer terminal 108. At S514, the system receives the delivery goods identification information specified by the recipient.

At S504, the system determines the delivery status included in the transmitted notification of confirmation result S205. When the delivery status is determined as "Reception approval", at S505, the system edits information for the result notification based on the delivery goods information DB 107 corresponding to the delivery goods identification information specified by the deliverer, and transmits the result notification information, whose destination is decided based on the deliverer DB 106 corresponding to the delivery goods identification information specified by the recipient, to the deliverer terminal 108 of FIG. 1 at S506. Further, at S507, the system updates the delivery status in the delivery goods information DB 107 of FIG. 1 to "Reception approved".

The legend 803 of FIG. 8 represents the delivery goods information DB 107 of FIG. 1 when the recipient "Suzuki" selects "Reception approved" with regard to the delivery status of the delivery goods identification information "111-1111-1111".

The legend 1004 of FIG. 10 represents the screen which displays information for the item name "Book", client "Sato", and recipient "Suzuki" relating to the delivery goods identification information "111-1111-1111" as a target for the result notification after the recipient "Suzuki" is authenticated as a recipient, and in which the recipient "Suzuki" selects "Reception approval" with respect to the delivery goods identification information "111-1111-1111".

The legend 1005 of FIG. 10 represents the screen image of the message that the recipient terminal 109 receives from the system when the delivery status indicates "Reception approval".

With regard to notification of the delivery status to the recipient after "Reception approval" is selected, as a response to the confirmation notification from the recipient to the deliverer, for example, a box number for reception allocated by the system and a secret number used to open the box are notified. Thereby, the recipient becomes capable of taking out the delivery goods from the box when he/she gets home. In addition to the above case, the recipient may specify a box number for reception and its secret number.

The legend 905 of FIG. 9 represents the screen image in the deliverer terminal 108 of the deliverer "Tanaka" when the recipient "Suzuki", after being authenticated as a recipient, specifies the delivery goods identification information "111-1111-1111" as a target for the result notification and "Reception approval" as the delivery status.

The legend 1103 of FIG. 11 represents the screen image of the message that the client terminal 109 receives from the system when the recipient "Suzuki", after being authenticated as a recipient, specifies "Reception approval" as the delivery status relating to the delivery goods identification information "111-1111-1111" as a target for the result notification.

When the delivery status indicates "Refusal", at S508, the system edits information for the result notification based on the delivery goods information DB 107 corresponding to the delivery goods identification information specified by the deliverer. At S509, the system then transmits the result notification information, whose destination is decided based on the deliverer DB 106 corresponding to the delivery goods identification information specified by the recipient, to the deliverer terminal 108 of FIG. 1. Further, at S510, the system updates the delivery status in the delivery goods information DB 107 of FIG. 1 to "Reception refused".

The legend 804 of FIG. 8 represents the delivery goods information DB 107 of FIG. 1 when the recipient "Suzuki" selects "Reception refusal" as the delivery status of the delivery goods identification information "111-1111-1111".

The legend 1006 of FIG. 10 represents the screen which displays information for the item name "Book", client "Sato", and recipient "Suzuki" relating to the delivery goods identification information "111-1111-1111" as a target for the result of the confirmation request after the recipient "Suzuki" is authenticated as a recipient, and in which the recipient "Suzuki" selects "Reception refusal" with respect to the delivery goods identification information "111-1111-1111".

The legend 1007 of FIG. 10 represents the screen image of the message that the recipient terminal 109 receives from the system when the delivery status indicates "Reception refused".

The legend 906 of FIG. 9 represents the screen image of the message that the deliverer terminal 108 receives from the system when the recipient "Suzuki", after being authenticated as a recipient, specifies the delivery goods identification information "111-1111-1111" as a target for notification of confirmation and "Reception refusal" as the delivery status.

The legends 1101 and 1102 of FIG. 11 each represent the screen image of the message that the client terminal 109 receives from the system when the recipient "Suzuki", after being authenticated as a recipient, specifies "Reception refusal" as the delivery status relating to the delivery goods identification information "111-1111-1111" as a target for the result of the confirmation request.

A second embodiment of the method for managing delivery goods according to this invention will be explained in detail below.

Figure 13:
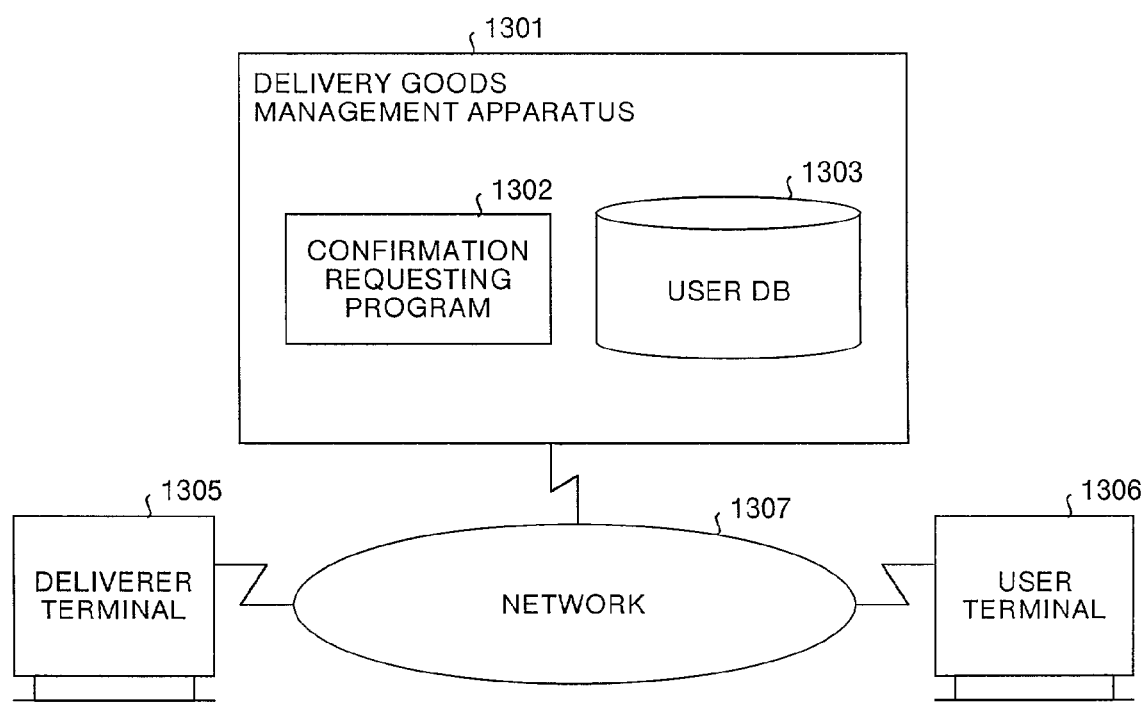
FIG. 13 is a block diagram showing a system construction of a second embodiment of this invention.

FIG. 13 shows the system construction of the second embodiment of this invention. It is assumed that the delivery goods management apparatus 1301 is connected with at least one deliverer terminal 1305 operated by a deliverer and at least one user terminal 1306 operated by a recipient, through a network 1307.

The delivery goods management apparatus 1301 is installed in the entrance of a collective housing such as an apartment, and has a user DB 1303 that stores names of residents, room numbers, telephone numbers, and mail addresses. The delivery goods management apparatus 1301 also has a confirmation requesting program 1302 that receives a delivery goods reception confirmation request from a deliverer, edits information for the confirmation request by referring to the user DB 1303 based on the confirmation request as input data, and transmits the confirmation request information to a recipient.

Figure 14:
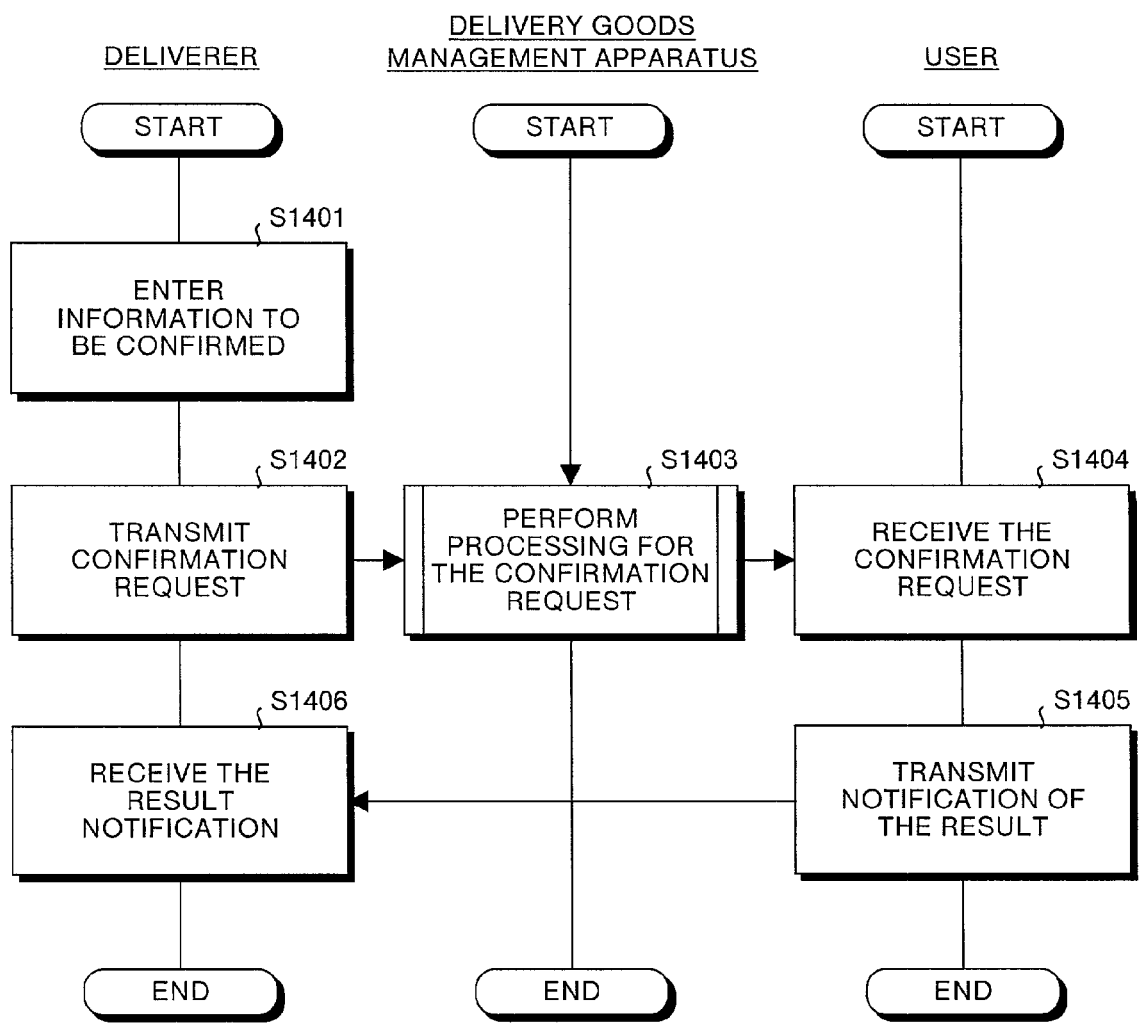
FIG. 14 is a flowchart for explaining the overall processing of the second embodiment.
Figure 16:
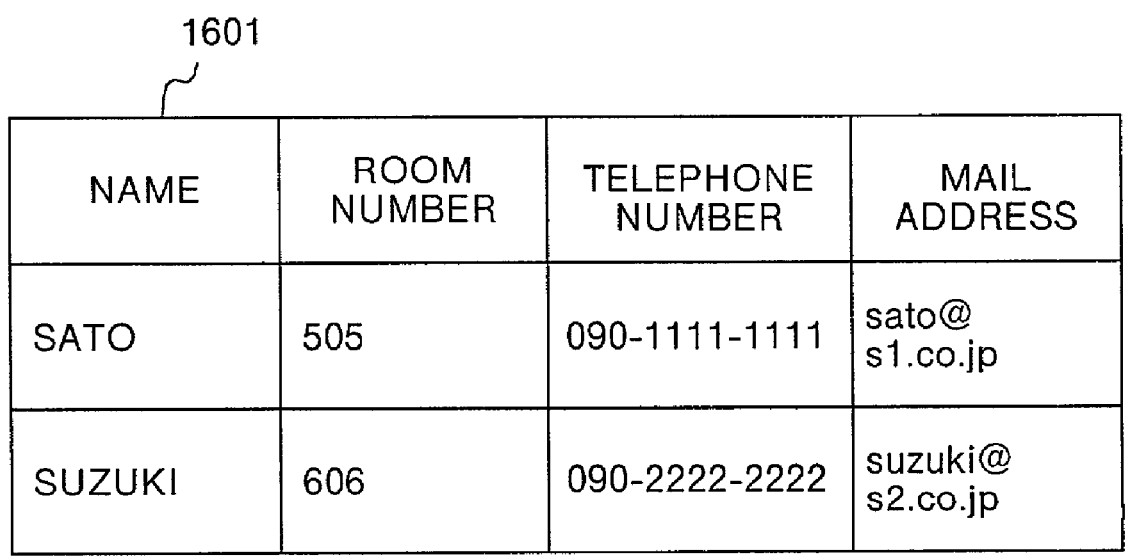
FIG. 16 shows an example of a user DB of the second embodiment.

The processing performed in response to requests from a deliverer and a recipient, when the recipient of delivery goods requiring reception approval is not at home, will be explained with reference to FIG. 13, FIG. 14, and FIG. 16. FIG. 14 is a flowchart for explaining the overall processing. FIG. 16 shows specific contents of the user DB 1303.

The information of FIG. 16 required to previously be registered in order to realize this invention will be explained first. FIG. 16 shows the information registered by the administrator of the system.

The legend 1601 of FIG. 16 represents the user DB 1303 of FIG. 13, in which the names, room numbers, telephone numbers, and mail addresses are registered for each user.

The operation of the system will be explained below with reference to FIG. 14. More specifically, this system is for notifying a recipient of a confirmation request including information for delivery goods entered by a deliverer when the recipient of the delivery goods requiring reception approval is away from home.

When the recipient is not at home so that the delivery goods requiring reception approval cannot be delivered, the deliverer performs processing for entering a confirmation request S1401 to confirm the intention of the recipient and transmitting the confirmation request S1402. The information for the transmitted confirmation request includes the name, room number, and the delivery goods information entered by the deliverer.

The delivery goods management apparatus 1301 performs the processing for the confirmation request based on the confirmation request information received at S1403.

Figure 15:
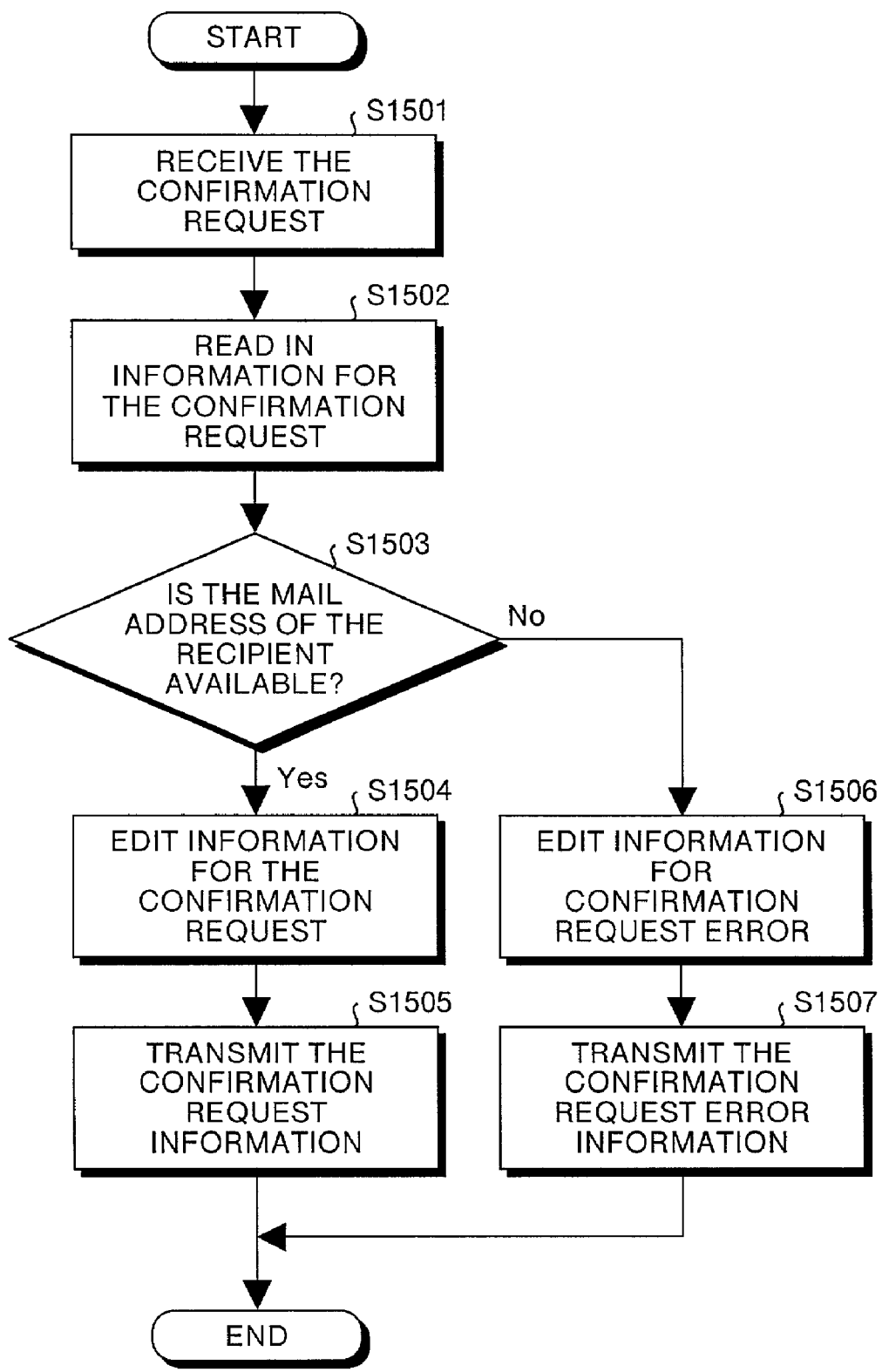
FIG. 15 is a flowchart for explaining the processing for a delivery goods reception confirmation request of the second embodiment.

The processing for the confirmation request will be explained below with reference to FIG. 15. At S1501, the delivery goods management apparatus 1301 receives the confirmation request, reads in the confirmation request information at S1502, and performs authentication of the deliverer by comparing the name and room number in the confirmation request information with the name and room number in the user DB 1303. At S1503, the delivery goods management apparatus 1301 determines whether there is the mail address of the recipient.

Figure 17:
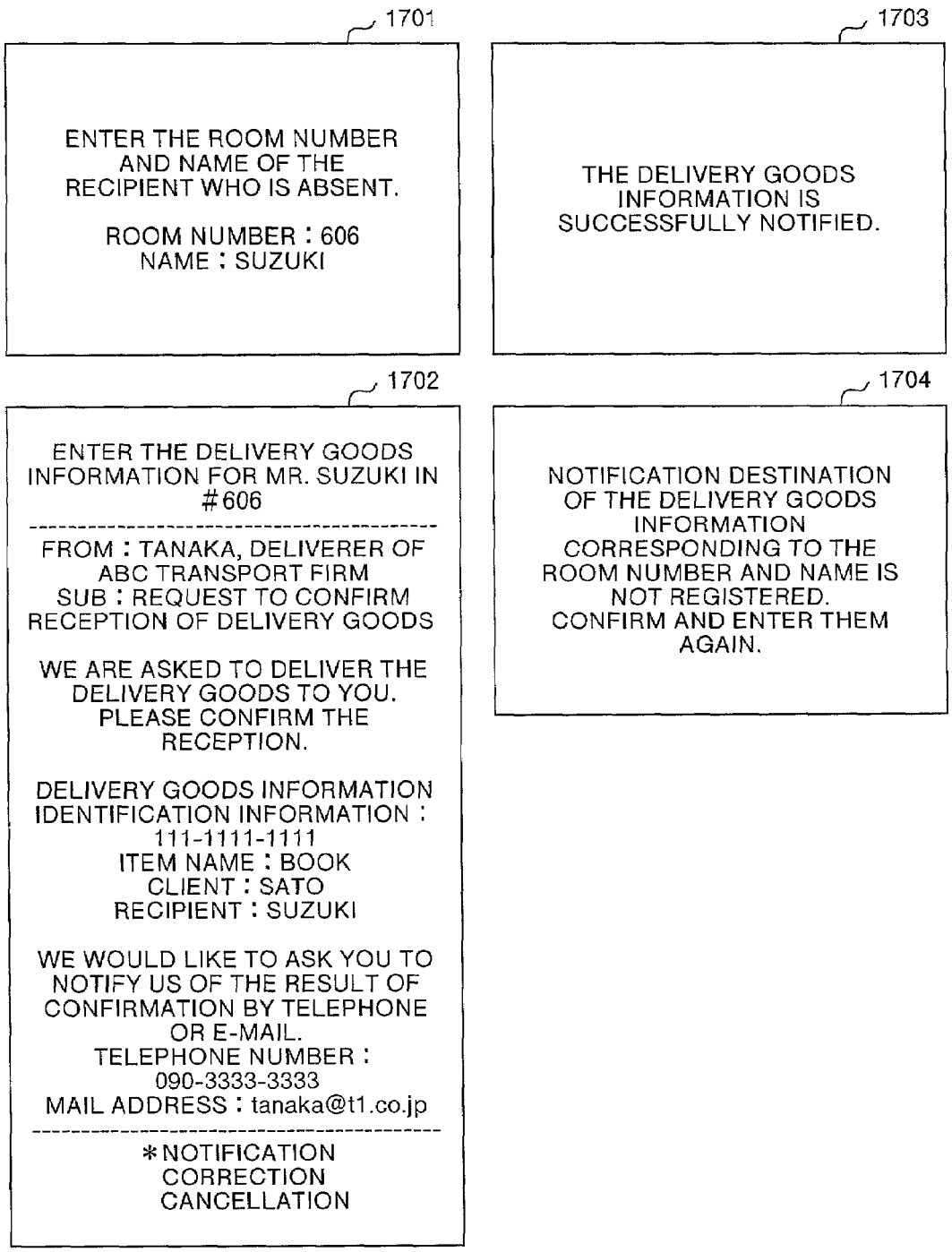
FIG. 17 shows an example of display screens in the system installed in places such as apartments of the second embodiment.

The legend 1701 of FIG. 17 represents the screen image of this system 1301 when the deliverer "Tanaka" enters the confirmation request information for the room number "606" and name "Suzuki" to the system.

When it is determined that there is no mail address of the recipient, the system 1301 performs edit S1506 of information for confirmation request error and display S1507 of the confirmation-request error information.

The legend 1704 of FIG. 17 represents the screen image of the system 1301 when the deliverer "Tanaka" may erroneously enter the room number or name to the system, or when the mail address corresponding to the room number and name may not be registered in the system.

When the mail address of the recipient is available, the system 1301 performs edit S1504 of information for the confirmation request and display S1505 of the confirmation request information.

The legend 1702 of FIG. 17 represents the screen image of the system 1301 when the deliverer "Tanaka" is to enter specific confirmation request information based on a state where the room number "606" and name "Suzuki" are entered to the system and the mail address corresponding to the room number and name are registered in the system.

The legend 1703 of FIG. 17 represents the screen image of the system 1301 after the deliverer "Tanaka" transmits the confirmation request information to the mail address corresponding to the room number "606" and name "Suzuki", to the system.

The legend 1801 of FIG. 18 represents an example of the received message in the user terminal 1306 of the recipient "Suzuki" who has received the confirmation request S1404 from the system.

The recipient transmits notification of the result S1405 to the deliverer terminal 1305 in order to notify the deliverer of the intention of the recipient. The information for the transmitted result notification includes the mail address and telephone number of the deliverer, and the information for delivery goods reception approval/refusal entered by the recipient.

The legend 1802 of FIG. 18 represents an example of the received message in the deliverer terminal 1305 of the deliverer "Tanaka" who has received the result notification about delivery goods reception approval from the recipient terminal 1306 at S1406.

The legend 1803 of FIG. 18 represents an example of the received message in the deliverer terminal 1305 of the deliverer "Tanaka" who has received the result notification about delivery goods reception refusal from the recipient terminal 1306 at S1406.

The deliverer finishes the delivery according to the notification of the result received at S1406 from the recipient terminal 1306. The destination of notification of the recipient's intention is not the deliverer terminal 1305 but may be the system placed in the apartment. Further, although the recipient sends back a response to the deliverer by e-mail in the above example, the method of getting in touch with the deliverer by telephone may be considered.

With regard to the first problem to be solved, delivery goods reception can be approved by the method according to this invention of transmitting confirmation information for delivery goods reception from the deliverer terminal to the user terminal. Therefore, there is an advantageous effect that delivery can be completed even if a recipient is not at home and a deliverer cannot obtain delivery goods reception approval by the recipient.

Delivery goods reception can be approved by the method of transmitting notification information for the result of delivery goods reception confirmation from a recipient terminal to the deliverer terminal. Therefore, there is an advantageous effect that the delivery goods can be delivered even if the recipient is away from home and the deliverer cannot obtain the delivery goods reception approval from the recipient.

Further, a client can confirm whether the delivery goods is received by a recipient by the method of transmitting notification information for the result of delivery goods reception confirmation sent from the recipient terminal to the client terminal. Therefore, there is an advantageous effect that the client can get to know about whether the delivery goods is received by the recipient in real time.

With regard to the second problem to be solved, delivery goods reception can be approved by the method of transmitting information for delivery goods reception confirmation entered by a deliverer on the spot to a user terminal without requiring to previously register the deliverer who can access the system of this invention. Therefore, there is an advantageous effect that delivery can be completed even if a recipient is not at home and the deliverer cannot obtain the delivery goods reception approval from the recipient. There is another advantageous effect that the recipient can receive the delivery goods.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of managing delivery goods using a delivery goods management apparatus for directly delivering goods from a deliverer to a location associated with a recipient when the recipient is absent from the location, wherein said management apparatus is equipped, at least, with a CPU and a storage containing a deliverer database having deliverer IDs, a user database having user IDs and a delivery goods information database having at least identification information for delivery goods, and is connected with at least one deliverer terminal operated by the deliverer and at least one user terminal operated by a client or the recipient through a network so as to be accessed both by the deliverer and the recipient, said method comprising:

receiving, at the delivery goods management apparatus, a request sent from the deliverer terminal to the user terminal to confirm reception of delivery goods entered by the deliverer through the deliverer terminal while the recipient of the delivery goods from the location is absent, wherein the request includes a message to confirm as to whether the recipient approves or rejects delivery of the goods by the deliverer to the location;

extracting using the CPU, recipient information from the storage of the delivery goods management apparatus, where the user database stores the recipient information corresponding to information related to the request to confirm reception of the delivery goods, and editing information for the request by referring to the user database and the delivery goods information database; and transmitting using the CPU, a notification, from the delivery goods management apparatus, to said recipient of confirmation request information through the user terminal based on the recipient information while the recipient is absent from the location, said method further comprising:

storing information for the deliverer corresponding to delivery goods identification information in said deliverer database and receiving the delivery goods identification information and reception approval/refusal information entered by said recipient;

extracting using the CPU, the deliverer information relevant to the delivery goods identification information from said deliverer database; and notifying using the CPU, said deliverer of the reception approval/refusal information based on the deliverer information, so that the deliverer delivers the goods to the location associated with the recipient while the recipient is absent when a result of the reception approval/refusal information indicates an approval of the delivery of the goods by the recipient and notifying the deliverer to not deliver the goods while the recipient is absent when the result of the reception/refusal information indicates a refusal of the delivery of the goods by the recipient.

2. The method of managing delivery goods according to claim 1 further comprising:

further storing information for a client corresponding to the delivery goods information in said storage, and extracting the delivery goods information and client information relevant to the delivery goods identification information from said storage; and notifying said client of the reception approval/refusal information based on the client information.

3. A delivery goods management apparatus for managing a direct delivery of goods from a deliverer to a location associated with a recipient when the recipient is absent from the location, wherein said management apparatus is equipped at least, with a CPU and a storage containing a deliverer database having deliverer IDs, a user database having user IDs and a delivery goods information database having at least identification information for delivery goods, and is connected with at least one deliverer terminal operated by the deliverer and at least one user terminal operated by a client or the recipient through a network so as to be accessed both by the deliverer and recipient, comprising:

a storage which stores recipient information corresponding to information related to a request to confirm reception of delivery goods, which includes a message sent from the deliverer terminal to the user terminal to confirm as to whether the recipient approves or rejects delivery of the goods by the deliverer to the location, and also stores information related to the deliverer corresponding to the delivery goods information in said storage;

a unit which receives information for the confirmation request entered by the deliverer when the recipient of the delivery goods is absent from the location, and also receives the delivery goods identification information and reception approval/refusal information entered by said recipient;

a unit which extracts, using the CPU, the information entered by said recipient and also extracts, from said storage, the deliverer information relevant to the delivery goods identification information; and a unit which transmits a notification, from the delivery goods management apparatus, to said recipient of the confirmation request information based on the recipient information while the recipient is absent from the location, and also notifies said deliverer of the reception approval/refusal information based on the deliverer information, so that the deliverer delivers the goods to the location associated with the recipient while the recipient is absent when a result of the reception approval/refusal information indicates an approval of the delivery of the goods by the recipient and notifying the deliverer to not deliver the goods while the recipient is absent when the result of the reception approval/refusal information indicates a refusal of the goods by the recipient.

4. A computer readable storage medium which stores a program for making a computer execute a direct delivery of goods from a deliverer to a location associated with a recipient when the recipient is absent from the location, wherein a management apparatus is equipped, at least, with a CPU and a storage containing a deliverer database having deliverer IDs, a user database having user IDs and a delivery goods information database having at least identification information for delivery goods, and is connected with at least one deliverer terminal operated by the deliverer and at least one user terminal operated by a client or the recipient through a network so as to be accessed both by the deliverer and recipient, said program causing the computer to execute receiving, at the delivery goods management apparatus a request to confirm reception of delivery goods at the location associated with the recipient sent by the deliverer through the delivery terminal to the recipient when the recipient of the delivery goods is absent from the location, wherein the request includes a message to confirm as to whether the recipient approves or rejects delivery of the goods by the deliverer to the location;

extracting recipient information from the storage of the delivery goods management apparatus, where the user database stores the recipient information corresponding to information related to the request to confirm reception of the delivery goods, and editing information for the request by referring to the user database and the delivery goods information database; and transmitting a notification, from the delivery goods management apparatus, to said recipient of the confirmation request information through the user terminal based on the recipient information while the recipient is absent from the location;

storing information for the deliverer corresponding to delivery goods identification information in said storage and receive the delivery goods identification information and reception approval/refusal information entered by said recipient;

extracting the deliverer information relevant to the delivery goods identification information from said deliverer database; and notifying said deliverer of the reception approval/refusal information based on the deliverer information, so that the deliverer delivers the goods to the location associated with the recipient when a result of the reception approval/refusal information indicates an approval of the delivery of the goods by the recipient and notifying the deliverer to not deliver the goods while the recipient is absent when the result of the reception approval/refusal information indicates a refusal of the delivery of the goods by the recipient.

5. The computer readable storage medium which stores a program according to claim 4, further making the computer:

further store information for the client corresponding to the delivery goods information in said storage, and extract the delivery goods information and client information relevant to the delivery goods identification information from said storage; and notify said client of the reception approval/refusal information based on the client information.

6. A method in a data processing system for managing the direct delivery of an item to a location associated with a recipient when the recipient is absent from the location, wherein a management apparatus is equipped, at least, with a CPU and a storage containing a deliverer database having deliverer IDs, a user database having user IDs and a delivery goods information database having at least identification information for delivery goods, and is connected with at least one deliverer terminal operated by a deliverer and at least one user terminal operated by a client or the recipient through a network so as to be accessed both by the deliverer and the recipient, said method comprising:

receiving, at the delivery goods management apparatus, a request to confirm reception of delivery goods entered by the deliverer through the delivery terminal and sent from the deliverer to the recipient when the recipient of the delivery goods from the location is absent, wherein the request includes a message to confirm as to whether the recipient approves or rejects delivery of the goods by the deliverer to the location;

extracting recipient information from the storage of the delivery goods management apparatus using the CPU, where the user database stores the recipient information corresponding to information related to the request to confirm reception of the delivery goods, and editing information for the request by referring to the user database and the delivery goods information database;

transmitting a notification using the CPU, from the delivery goods management apparatus, to said recipient of confirmation request information through the user terminal based on the recipient information while the recipient is absent from the location;

storing information for the deliverer corresponding to delivery goods identification information in said deliverer database and receiving the delivery goods identification information and reception approval/refusal information entered by said recipient;

extracting using the CPU, the information for the deliverer relevant to the delivery goods identification information from said deliverer database; and notifying said deliverer of the reception approval/refusal information based on the deliverer information using the CPU, so that the deliverer delivers the goods to the location associated with the recipient while the recipient is absent when a result of the reception approval/refusal information indicates an approval of the delivery of the goods by the recipient and notifying the deliverer to not deliver the goods while the recipient is absent when the result of the reception approval/refusal information indicates a refusal of the goods by the recipient.

7. A method of operating a data processing system for managing the direct delivery of an item to a location associated with a recipient when the recipient is absent from the location, wherein said management apparatus is equipped, at least with a CPU and a storage containing a deliverer database having deliverer IDs, a user database having user IDs and a delivery goods information database having at least identification information for delivery goods, and is connected with at least one deliverer terminal operated by a deliverer and at least one user terminal operated by a client or recipient through a network so as to be accessed both by the deliverer and the recipient, said method, comprising:

receiving, at the delivery goods management apparatus, a request sent from the deliverer to the recipient to confirm reception of delivery goods entered by the deliverer through the delivery terminal when the recipient of the delivery goods from the location is absent, wherein the request includes a message to confirm as to whether the recipient approves or rejects delivery of the goods by the deliverer to the location;

extracting using the CPU, recipient information from the storage of the delivery goods management apparatus, where the user database stores the recipient information corresponding to information related to the request to confirm reception of the delivery goods, and editing information for the request by referring to the user database and the delivery goods information database;

transmitting using the CPU, a notification from the delivery goods management apparatus to said recipient of confirmation request information through the user terminal based on the recipient information while the recipient is absent from the location;

storing information for the deliverer corresponding to delivery goods identification information in said deliverer database and receiving the delivery goods identification information and reception approval/refusal information entered by said recipient;

extracting using the CPU, the deliverer information relevant to the delivery goods identification information from said deliverer database; and notifying said deliverer of the reception approval/refusal information based on the deliverer information, so that the deliverer delivers the goods to the location associated with the recipient while the recipient is absent when a result of the reception approval/refusal information indicates an approval of the delivery of the goods by the recipient and notifying the deliverer to not deliver the goods while the recipient is absent when the result of the reception approval/refusal information indicates a refusal of the delivery of the goods by the recipient.

8. The delivery goods management apparatus according to claim 3, wherein said storage further stores information for the client corresponding to the delivery goods information, said unit which extracts the information entered by said recipient, further extracts the delivery goods information and client information relevant to the delivery goods identification information from said storage; and said unit which notifies said recipient of the confirmation request information further notifies said client of the reception approval/refusal information based on the client information.

* * * * *